United States Patent
Cook et al.

[11] Patent Number: 5,933,347
[45] Date of Patent: Aug. 3, 1999

[54] INDUSTRIAL CONTROLLER WITH PROGRAM SYNCHRONIZED UPDATING OF BACK-UP CONTROLLER

[75] Inventors: William B. Cook, Northfield Center; Mark A. Flood, Mayfield Heights; Kenneth W. Batcher, Hudson, all of Ohio

[73] Assignee: Allen-Bradley Company LLC, Milwaukee, Wis.

[21] Appl. No.: 08/876,155

[22] Filed: Jun. 13, 1997

[51] Int. Cl.$^6$ .................................................... G05B 9/02
[52] U.S. Cl. ........................ 364/187; 364/134; 364/184; 364/185; 364/186
[58] Field of Search ........................ 364/181, 131–134, 364/187–189, 184, 191, 194, 468.05, 468.06, 468.07, 469.01, 551.01, 550; 395/650, 651, 670, 775, 182.11, 182.05, 182.09, 183.17, 200.12, 200.11

[56] References Cited

U.S. PATENT DOCUMENTS

| | | | |
|---|---|---|---|
| 4,521,871 | 6/1985 | Galdun et al. | 364/900 |
| 4,638,452 | 1/1987 | Schultz et al. | 364/900 |
| 4,872,106 | 10/1989 | Slater | 364/200 |
| 4,958,270 | 9/1990 | Mclaughlin et al. | 364/187 |
| 5,142,470 | 8/1992 | Bristow et al. | 364/184 |
| 5,185,693 | 2/1993 | Loftis et al. | 364/187 |
| 5,193,189 | 3/1993 | Flood et al. | 395/650 |
| 5,636,124 | 6/1997 | Rischar et al. | 364/468.06 |
| 5,715,439 | 2/1998 | Schmidt et al. | 395/570 |
| 5,777,874 | 7/1998 | Flood et al. | 364/187 |

Primary Examiner—William Grant
Assistant Examiner—Ramesh Patel
Attorney, Agent, or Firm—Keith M. Baxter; John M. Miller; John J. Horn

[57] ABSTRACT

An industrial control system employs a primary and secondary controller each having a processor and an I/O data table. Updating of the secondary processor's I/O data table is accomplished synchronously with execution of the program in the primary processor at a particular point in the program. A tracking of changes in the I/O data table of the primary processor is used to transmit only changes in the I/O table to the secondary processor thereby avoiding undue interruption of the executing program while preserving synchronicity.

21 Claims, 4 Drawing Sheets

FIG. 6
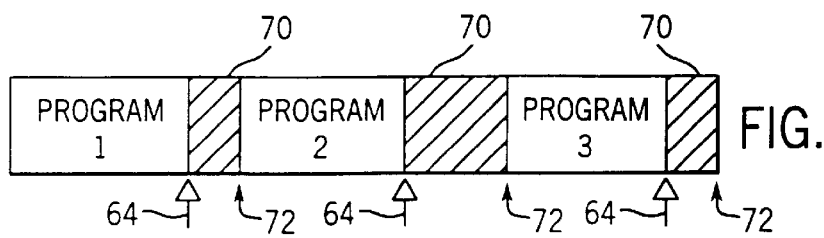
FIG. 7
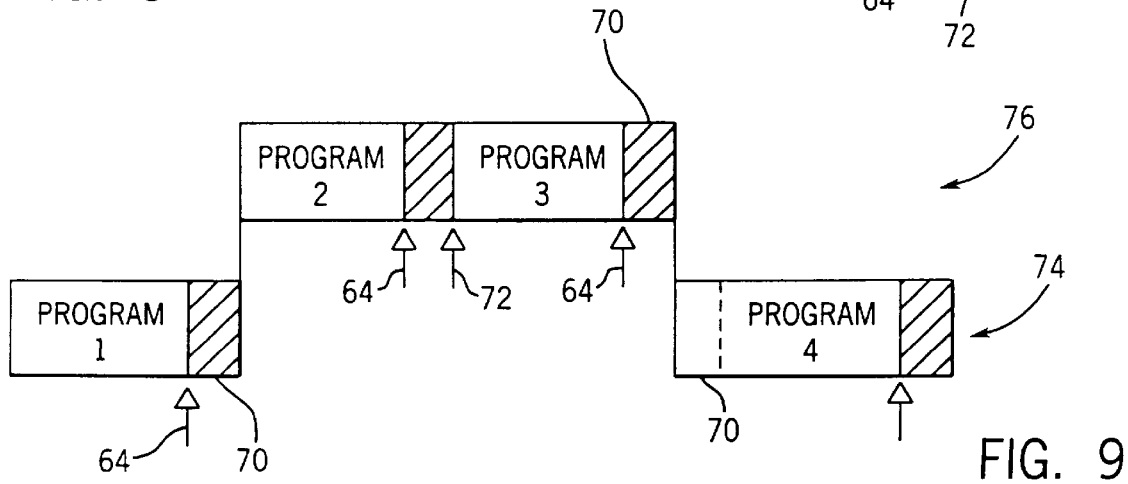
FIG. 8
FIG. 9

INDUSTRIAL CONTROLLER WITH PROGRAM SYNCHRONIZED UPDATING OF BACK-UP CONTROLLER

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers and in particular to an industrial controller system having a secondary controller providing back-up control capability.

Industrial controllers are special purpose computers used for controlling factory automation and the like. Under the direction of stored programs, a processor of the industrial controller examines a series of inputs reflecting the status of a controlled process and changes outputs affecting control of the controlled process. The stored control programs may be is continuously executed in a series of execution cycles, executed periodically, or executed based on events.

The inputs received by the industrial controller from the controlled process and the outputs transmitted by the industrial controller to the controlled process are normally passed through one or more input/output (I/O) modules) which serve as an electrical interface between the controller and the controlled process. The inputs and outputs are recorded in an I/O data table in processor memory. Input values may be asynchronously read from the controlled process by specialized circuitry. Output values are written directly to the I/O data table by the processor, then communicated to the controlled process by the specialized communications circuitry.

Industrial controllers must often provide uninterrupted and reliable operation for long periods of time. One method of ensuring such operation is by using redundant, secondary controller components (including processors) that may be switched in to replace primary controller components while the industrial controller is running. In the event of a failure of a primary component, or the need for maintenance of the components, for example, the secondary components may be activated to take over control functions. Maintenance or testing of the control program may be performed with the primary processor reserving the possibility of switching to the secondary processor (and a previous version or state of the control program) if problems develop.

Ideally, the switch-over between controllers or their components should occur without undue disruption of the controlled process. For this to be possible, the secondary processor must be running or waiting to run the same program (and maintaining its current state) and must be working with the same data in its I/O data table as is the primary processor.

The same control program may be simply pre-stored in each of the primary and secondary processors. The data of the I/O data table, however, cannot be pre-stored but changes continuously during the controlled process. Further, because control processes are I/O intensive, there is typically a large amount of data in the I/O data table. For this reason, transmitting the data to the secondary processor is difficult.

In order to effectively update the secondary processor with large amounts of I/O data, prior art controllers have continuously and asynchronously transmitted I/O data from the primary processor to the secondary processor during execution of the control program. Allowing the control program to continue to run, prevents the control process from being interrupted by the data transfer. Nevertheless, there are problems with this approach.

Asynchronous transfer means that at the time of switch-over to the secondary processor, the I/O data table of the secondary controller may have only been partially updated. Further, even the updated part of the I/O data table may be stale because the control program has continued to execute and change that data after its transmission. This I/O data will be termed "time fragmented" because it is not simply a uniformly delayed version of the I/O data table of the primary processor, but a version with different data delayed by sharply different amounts. Time fragmented data represents a control state that never existed because it includes I/O data taken from two or more different execution cycles of the control program.

A second problem that may occur at the time of switch-over is a so-called "data bump" where an output is changed back to an old state by a secondary controller only to be quickly restored to its original value as the secondary controller continues the control process. Data bumps can cause a momentary reversal of the control process with serious consequences to the controlled equipment. Unfortunately, even trivially stale data can cause data bumps.

BRIEF SUMMARY OF THE INVENTION

The present invention allows synchronization of the transmission of the I/O data with the execution of the control program eliminating time fragmentation of the data. The I/O data is transmitted to the secondary controller at predetermined times in the execution of the control program, and other control program operation is suspended during that transmission.

This synchronous transmission of I/O data, without undue disruption of the control process, is made possible by transmitting only the I/O data that has been changed since the last program execution cycle. Typically this is a small subset of the I/O data.

Tracking changed I/O data may be performed completely in hardware by detecting output writes to the I/O data table. The time consuming process of collecting this data for transmission may be performed by the control program itself at the conclusion of the execution cycle.

Specifically, the present invention provides a primary industrial controller communicating with a secondary industrial controller over a link. The primary industrial controller includes a memory holding a user program describing control of an industrial process or the like, and an I/O data table holding values of output signals exchanged with a controlled process. The memory also includes a flag table indicating changes to the I/O data table. A processor of the primary industrial controller communicates with the memory and operates to execute the user program to write to the I/O data table according to the user program. The processor also operates to flag changes in the I/O data by setting flags in the flag table. At a predetermined time, the processor communicates to the secondary processor only the values of the I/O data table that have changed as indicated by the flag table to the I/O data table.

Thus it is one object of the invention to provide a high speed data updating of a secondary processor that may be performed synchronously with program execution in the primary processor. By increasing the speed with which data may be transferred, the processor program may be stopped during the data transfer operation. Most simply, the data transfer may be initiated by the ending of an execution cycle of the control program or any one of the multiple control programs in a multi-tasking industrial controller. By concentrating and synchronizing the transfer of data at the end of a program, the secondary processor is assured of having an unfragmented control state when it begins I/O data table controlling.

The I/O data table may be divided into addresses and the flag table may include flags each indicating a change in at least one address in a defined range of addresses. The communication of changed values of the I/O data table will, in this case, communicate values from all addresses within ranges defined by set flags of the flag table. The range of addresses may be programmable as defined by a programmable register of the processor.

Thus it is another object of the invention to efficiently transfer I/O data by permitting the granularity of data transfer between the primary industrial controller and secondary industrial controller to be flexibly adjusted according to the amount of I/O and frequency of change in I/O data. Generally, larger I/O data table sizes may be accommodated with greater address ranges being assigned to each flag.

The primary industrial controller may at a second predetermined time after communicating the changes in the output values of the I/O data table, transmit to the secondary industrial controller an unwind signal indicating completion of the transfer.

Thus it is another object of the invention to permit the secondary industrial controller to determine whether only a partial transfer of I/O data has occurred when the transmission is interrupted part way through its transfer.

The processor may be a multi-tasking processor executing multiple tasks, including at least one user program, with tasks preempting other tasks according to priority rules. The primary industrial controller's communication to the secondary processor of the changed values of the I/O data table may be initiated by instructions within a program of a low priority task. That user program may be preempted by a program in a higher priority task. In the event of such preemption, the primary industrial controller suppresses completion of the communication of the I/O data table when the program of the low priority task resumes execution.

Thus it is another object of the invention to provide a method of updating data of an I/O data table in a multi-tasking environment. The flag table is shared by all tasks to ensure that a preempting task transfers the I/O data of the preempted task and prevents retransmission of that data later.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 6 is a table similar to that of FIG. 3 showing avoidance of the data bump problem with the sequence of data flow of FIG. 1;

FIG. 7 is a graphical representation of the execution of multiple programs on the controller of FIG. 4 showing synchronization points and unwind points for I/O data transfer;

FIG. 8 is a figure similar to that of FIG. 7 showing execution of multiple programs having different priorities and the operation of the data table transfer when a low priority program is pre-empted; and FIG. 9 is a figure similar to that of FIG. 8 showing a preemption occurring during the period of the I/O data transfer.

DETAILED DESCRIPTION OF THE INVENTION

Figure 1:
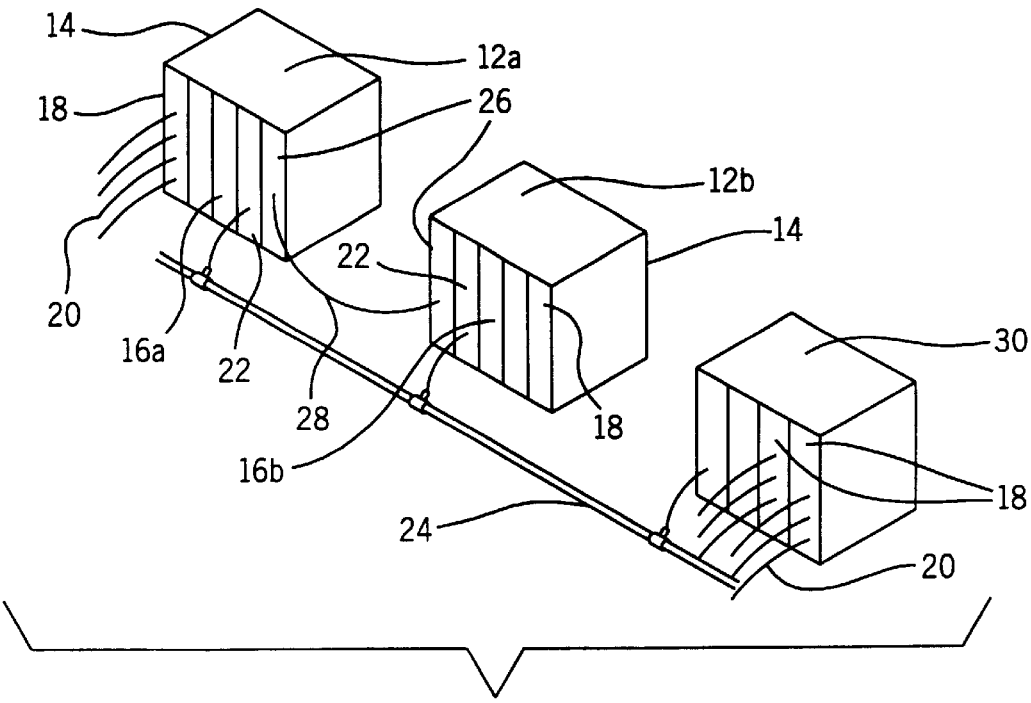
FIG. 1 is a simplified perspective view of an industrial controller employing a primary and secondary controller communicating on a common link with a remote I/O rack and a separate communication bus for I/O data table transfer.

Referring now to FIG. 1, an industrial control system of the present invention includes primary controller 12(a) and secondary controller 12(b) housed in separate racks 14. Each rack 14 holds processor modules 16(a) and 16(b), respectively, to be described in detail below.

Within the racks 14 of primary controller 12a are I/O modules 18 having I/O lines 20 communicating with a controlled process (not shown) for transferring input and output signals between the controllers 12(a) and the controlled process. In addition, both the racks 14 include communication modules 22 connecting the controllers 12(a) and 12(b) to a common general purpose link 24 and communication modules 26 connecting controllers 12(a) and 12(b) to a special dedicated communication link 28. The general purpose communication link 24 may connect to an I/O rack 30 having additional I/O modules 18 and I/O lines 20.

The dedicated communication link is used for the communication of I/O data between the processor modules 16(a) and 16(b) and the communication of information coordinating a switch-over between the operation of the primary and secondary controllers 12(a) and 12(b).

Figure 2:
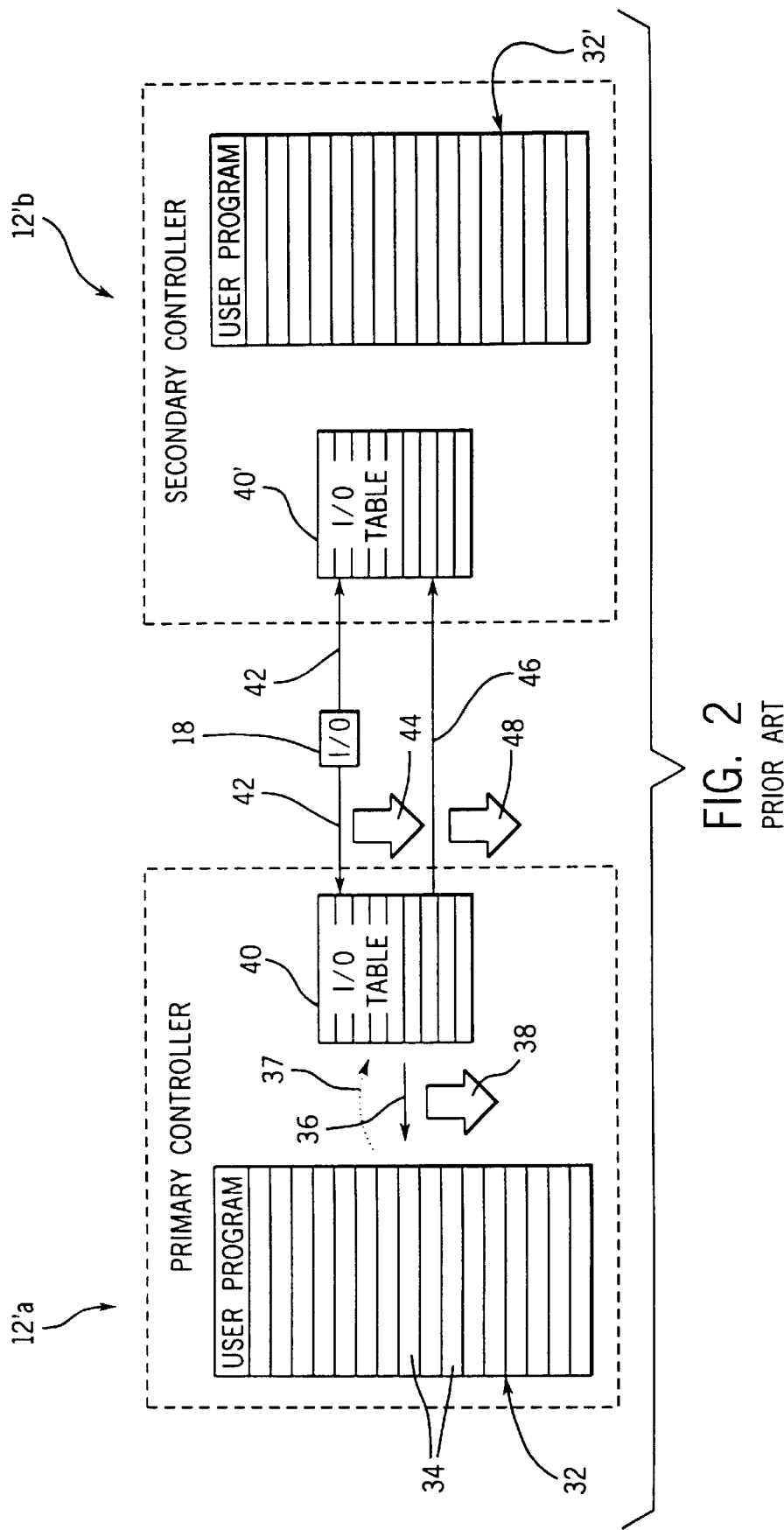
FIG. 2 is a schematic representation of prior art asynchronous transfer of data between I/O data tables of a primary and secondary industrial controller.

Referring now to FIGS. 1 and 2 in a prior art system, a primary controller 12(a)' and secondary controller 12(b)' both include copies of a user program 32 comprised of a sequence of instructions 34. During operation of the primary controller 12(a)', instructions 34 are executed in repeated execution cycles 38 at a scan point 36 scanning through the user program 32 writing data 37 to an I/O data table 40.

At the same time, I/O data table 40 is asynchronously updated over link 24 with current input values 42 from I/O modules 18 as indicated by arrow 44. Input values 42 are also received via link 24 at I/O data table 40' in the secondary controller 12(b)'. Output values in the I/O data table 40 may be transmitted (not shown) to the I/O 18 asynchronously or synchronously to the execution cycles 38 of the user program.

In the prior art, the data of the I/O data table 40 is asynchronously transferred as indicated by arrow 46 to the I/O data table 40' in secondary controller 12(b)'. This transfer of data provides the secondary controller 12(b)' with an updated I/O data table 40' in the event of a switch-over of control from the primary controller 12(a)' and proceeds through the data tables 40 and 40' in a scanning process 48.

Generally the scanning 48 of the I/O data transfer is asynchronous to the execution cycle 38 of the user program 32. Accordingly, at the completion of an execution cycle 38 of the user program 32, the I/O data table 40' will still contain some data as changed in a previous execution cycle 38 of the user program and some data reflecting the most recent execution cycle 38 of the user program 32. Further, because the user program is executed during the data transfer, some of the data in the I/O data table 40' reflecting the most recent execution cycle of the user program will no longer be current.

When control is switched to the secondary controller 12(b)', the user program 32' of secondary controller 12(b)' will begin an execution cycle of the user program 32' operating on a set of data in I/O data table 40' different from any set of data seen by the user program 32 of the primary controller 12(a)' at the beginning of its execution cycle 38. This time fragmentation of the data of the I/O data table 40' can produce anomalous behavior of the controlled process.

Figures 3, 4:
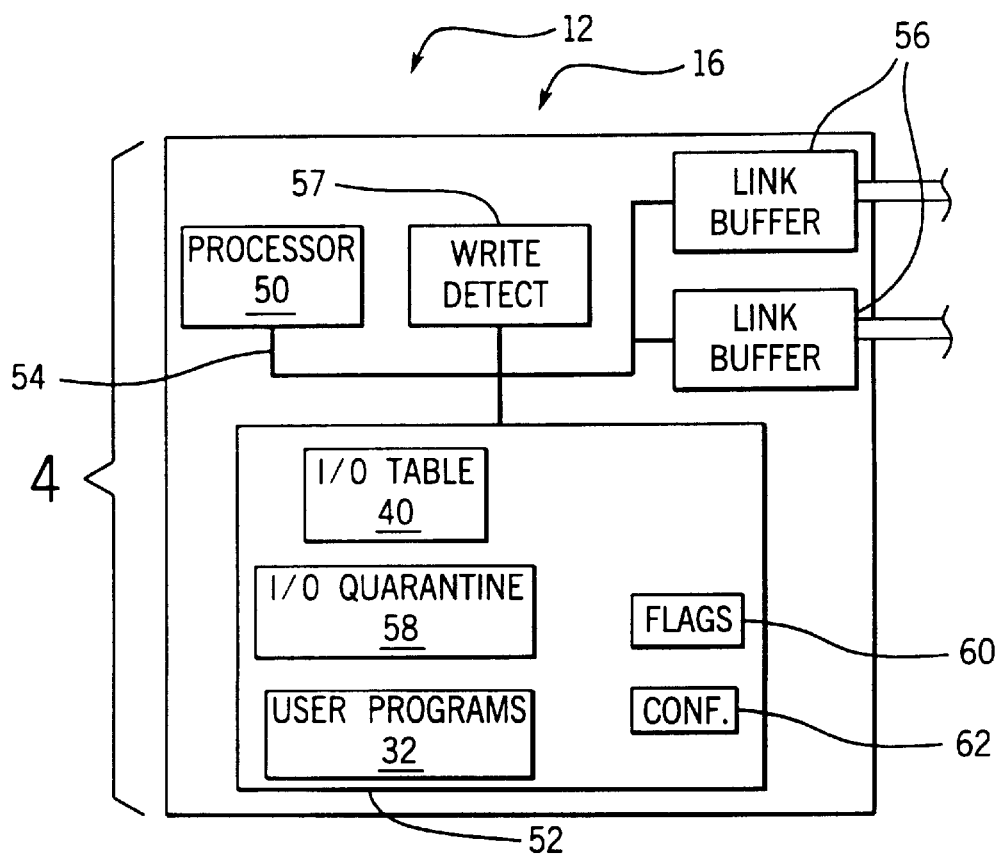
FIG. 3 is a table holding sequential output values of a prior art controller such as produces a rapid switching of an output to a previous state and then back again, such as is termed a data bump.
FIG. 4 is a block diagram of principal components of the controller of the present invention usable either as a primary or secondary controller.

Further, referring now to FIGS. 2 and 3, a second problem may arise from the lack of coordination between the transfer of data from the I/O data table 40 to the I/O modules 18, and the transfer of data from I/O data table 40 to the I/O data table 40'. This is illustrated in the table of FIG. 3, where the first column represents a single binary output value to the controlled process, the second column represents the output value contained in I/O data table 40 and the third column represents the output data contained in I/O data table 40'.

At a first interval in time shown in the first row of this table, the output value is '0' and a '0' is stored in the primary and secondary I/O data tables 40 and 40'. At a second later interval of time shown in the second column of the table in FIG. 3, the user program 32 may write a value of '1' to the I/O data table 40 and this value may be transmitted to the output. At a third later time interval in time shown by the third column of FIG. 3, the primary controller may switch-over control to the secondary controller 12(b)' prior to the scanning 48 of the I/O data table 40 updating the I/O data table 40' as would have occurred otherwise shown as a dotted arrow.

Immediately after the switch-over, shown in the fourth row of the table, a scanning of I/O data table 40' reads the old value of '0' from the secondary I/O data table 40' and writes it to the output returning the output value to ' 0'. Finally at the last column of FIG. 3, the user program of the secondary controller 12(b)' corrects the data value of the secondary I/O data table 40' as a result of the natural execution of the user program 32 and this value is written to the output value to restore it to '1'. This transition in the last three rows of the table of FIG. 3 of the output from '1' to '0' to '1' again is a data bump and is disruptive to a controlled process both because of the retrogressive state change from the new value of '1' to the old value of '0' (which would not have normally occurred) and because of the rapid toggling of the output value between '1', '0', and '1', which may adversely affect physical equipment with limited speed and response rates.

Referring now to FIG. 4, the present invention provides for a processor module 16 in an industrial controller 12 allowing the controller to be used either as a secondary or primary controller and which has special features to avoid time fragmented data in the data table and the data bumps described above.

Generally, the processor module 16 includes a processor 50, which may execute relay ladder logic frequently used in the industrial control environment as well as general purpose arithmetic and logical instructions.

The processor 50 communicates with a memory 52 by means of an internal bus 54. Memory 52 may include volatile and non-volatile memory types well known in the art. The internal bus 54 also connects the processor 50 to input and output link buffers 56 handling communication of data on a backplane to other modules of the controller 12, including the I/O modules 18 and the communication modules 22 and 26.

The processor module 16 also includes write-detect circuitry 57 detecting writes of the processor 50 to certain addresses of the memory 52 as will be described.

Memory 52 includes an I/O data table 40 as described above and an I/O quarantine table 58 similar in size to the I/O data table. User programs 32 are also stored in memory 52 as well as a flag table 60 and a configuration register 62 as will be described.

Figure 5:
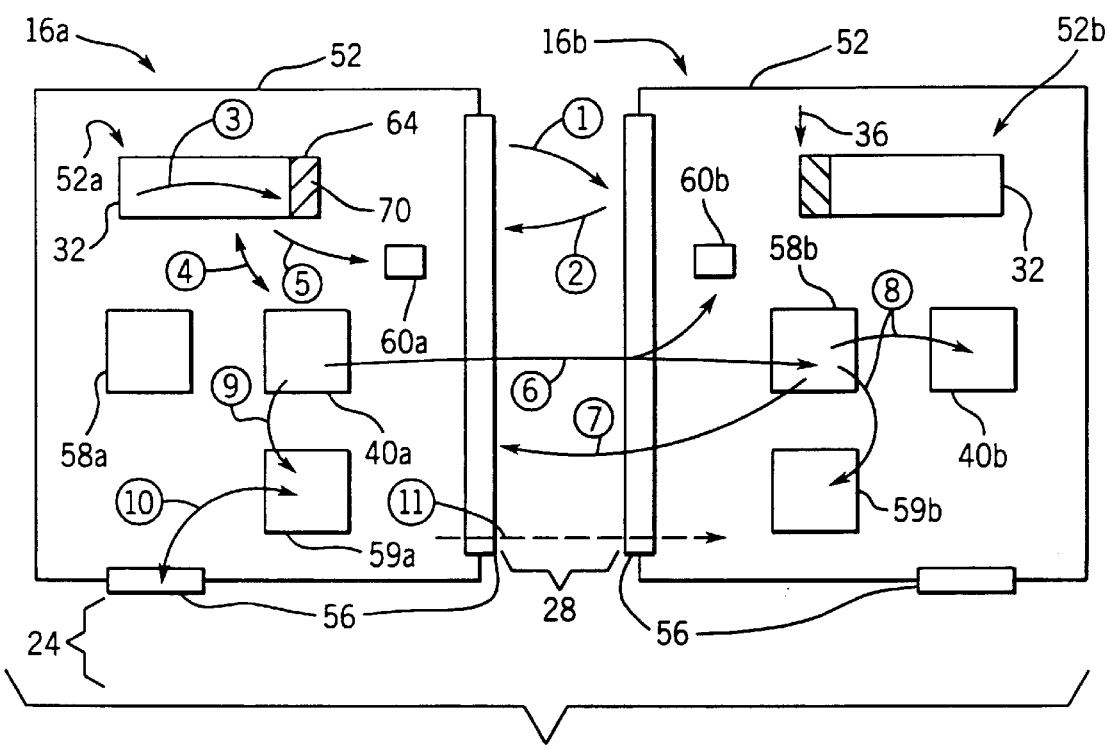
FIG. 5 is a simplified diagram of two controllers of FIG. 4 used as primary and secondary controllers showing a sequence of data flow used in the present invention.

Referring now to FIG. 5, the steps of synchronous data transfer between I/O data tables 40a and 40b of a primary processor 16(a) and secondary processor 16(b) begins when the primary processor 16(a) is ready to run a program 32. This program 32 may be one of several programs in the primary processor 16(a) distributed among several tasks of different priorities. The multi-tasking aspects of the present invention will be described below.

At the time primary processor 16(a) is ready to run a program 32, a message is transmitted to the secondary processor as indicated by the arrow labeled with a circled sequence number 1 indicating the order of the step in which the data transfer occurs. The message indicated by sequence number 1 includes a program instance number which identifies the program 32 from among many programs 32 which may be contained in the memory 52 of the processor 16(a) and many instances of program 32 which may occur in object oriented programming systems.

Processor 16(a) then receives back from processor 16(b) an acknowledgment signal indicated by sequence number 2 indicating that processor 16(b) has queued itself at the start of program 32 matching the program instance number previously provided.

In the event of a switch-over of control to the secondary processor 16(b), the secondary processor 16(b) will begin execution of program 32 at its start. It should be noted that at the time of switch-over, the primary processor 16(a) will typically be executing instructions somewhere in the body of program 32 rather than at the start. Accordingly, at the time of switch-over, there will be some rollback by the secondary processor 16(b) in the point of program execution. Nevertheless, it can be assured that the correct program 32 will be executing and that the I/O data is consistent with that of the primary processor 16(a) when it was at the beginning of its program as will be seen. Significantly, in multi-program systems, the partitioning of each of the programs with their own separate data transmissions ensures that the rollback experienced during a switch-over will be minimized to no more than the length of one program within any one task.

As indicated by sequence arrow 3, processor 16(a) then begins execution of the user program exchanging data with the I/O quarantine table 58 as indicated by sequence arrow 4. Such data exchange includes writing output values to I/O data table 40a and reading input values from I/O data table 40a.

The input values of the I/O data table 40a may be asynchronously updated with new input values from the controlled process, however, no output values are transmitted to I/O data table 40a at this time.

At the time of each writing to I/O data table 40a as indicated by sequence number 4, if the writing is to an output value or to an internal variable to processor 16(a), a flag is set in flag table 60a as indicated by sequence arrow 5. This setting of the flag in the preferred embodiment is accomplished by specialized circuitry of the processor 16(a). Specifically, the write lines to the I/O data table 40a are monitored and the range of addresses reserved for the I/O data table 40a detected. The I/O data table 40a is divided into subranges according to a range value held in the configuration register 62 (shown in FIG. 4). When a write to the quarantine table is detected, the particular subrange is then determined and any change within a given sub-range results in the setting of a flag in the flag table 60 unique to that sub-range. Thus, each set flag indicates that there has been a writing of an output value to the I/O data table 40a within a range defined by a start and ending value programmed into the configuration register 62. Hence at the conclusion of the execution of program 32, flags set in flag table 60a identify all changed output and internal variable values in the I/O data table 40a.

Because this flag setting process may be accomplished by circuitry, detecting writes and ranges, it does not slow down the execution of the program 32 by processor 16(a).

Referring still to FIGS. 4 and 5, ultimately, in the execution of any program 32 indicated by sequence number 3, a portion of program 32 termed the synchronization point (indicated by arrow 64) is reached. The synchronization point begins a packet collection portion 70 of the program 32 that reviews the flags of flag table 60a (as are readable by processor 16(a)) and for each flag that is set takes data out of I/O data table 40a and forms a transmission packet that is loaded into the link buffer 56. The packet collection portion 70 merely needs to search through the flag table 60a and collect the necessary data, but need not attend the low level data transmission problems which are tended to by the link buffer 56. The link buffer communicates the transmission packet on the link 28 to processor 16(b) via module 26 and to a second quarantine table 58b as indicated by an arrow marked by sequence number 6. As the data is collected for transmission, the associated flags are reset.

At processor 16(b), the data of the transmission packets are received by the quarantine table 58b. This process of writing also serves to set flags in a second flag register 60b operating similarly to flag register 16(a) as has been previously described.

Processor 16(a) after it has finished collecting and sending transmission packets sends to processor 16(b), an 'unwind' signal (also indicated by sequence arrow 6) indicating a completion of the transmission and including an indication of the last packet sent. This unwind signal is necessary because the transmission of I/O data is not constant in length but depends on how much I/O data has changed. It will be understood that by transmitting only changed I/O data, however, the time required for transmission is much reduced. The data packets sent may contain an instance number indicating which portion of the program has been executed by the primary processor so that the secondary processor can take all program portions, for data packets that it has received since the last unwind signal, off its run list when the unwind command is received.

The secondary processor 16(b) after receiving the unwind signal sends back an acknowledgment signal indicated by sequence arrow 7 indicating that all the data has been received based upon the 'last packet' number of the unwind command. At this time, back up processor 16(b) begins to transfer the data from quarantine register 58b to I/O data table 40b and output transmit buffers 59b associated with processor 16(b) as indicated by sequence number 8. This latter transfer transfers only changed data as indicated by flag register 60b and is extremely rapid as it is being accomplished internally to the processor 16(b). Accordingly in the event of a switch-over, the data in I/O data table 40b can be assured of reflecting a single scanning of program 32 and thus of not being time fragmented. If for some reason, the transmission process from processor 16(a) to processor 16(b) is interrupted, an unwind signal will not be received and no updating of 40b or 59b will occur.

When the primary processor 16(a) receives the acknowledgment signal 7, the primary processor 16(a) begins a transfer of output data for I/O data table 40a to the output transmit buffer 59a as indicated by sequence arrow 9. This transfer may begin at the same time as the transfer of sequence arrow 8 from quarantine register 58b to I/O data tables 40b and 59b.

Only after the output transfer buffer 59a is updated is the output data transferred to the controlled process as indicated by sequence arrow 10.

As indicated by sequence arrow 11, a switch-over message may be received by secondary processor 16(b) at which time it undertakes to execute program 32' starting at its top indicated by program counter 36 using the data of data table 40b. This switch-over may occur at any time.

Referring now to FIG. 6, it can be seen that the sequence of FIG. 5 eliminates data bumps by assuring that the secondary processor 16(b) has a complete copy of all output values before those output values are reflected to the actual outputs of the controlled process. In FIG. 6 as with FIG. 3, the first column indicates the state of an output to the controlled process, the second column indicates a data value of I/O data table 40a and the third column indicates a data value of I/O data table 40b. In a first interval in time, all values may be zero reflecting a previous updating of I/O data tables and outputs. At a second interval in time, represented by the second row of the table of FIG. 6, the user program 32 may write an output value of '1' to a primary I/O data table (in this case I/O data table 40a) which is then transmitted to the secondary I/O data table (in this case quarantine output data table 58b).

A switch-over at this interval does not cause a data bump because the value of '1' has not yet been transmitted to the controlled process. As mentioned above, the data transmitted to the secondary I/O table is quarantined until an unwind signal is received, so even an interruption during the transmission of data does not cause a problem.

At a third time interval represented by the third row of the table, a switch-over occurs. Still there is no data bump because the output value has not been sent to the controlled process. Only at the fourth interval in time represented by the fourth row of the table is the new output value transmitted from the secondary I/O data table to the output.

The present invention is intended to be used in a multi-tasking system in which tasks include multiple programs and where different tasks of different priorities may interrupt or pre-empt each other. Referring now to FIG. 7 in the execution of a single task with multiple programs, each program has its own synchronization point. The synchronization point is followed by packet collection portion 70 undertaking the transfer data from the I/O data table 40a to the data quarantine table 58b as has been previously described. The packet collection portion 70 concludes with the generation of an unwind signal 72.

Referring now to FIG. 8 in a multi-tasking system, a first program in a low priority task 74 may be preempted by a second and third program in a high priority task 76. In one case, the program '1' is pre-empted prior to reaching its synchronization point 64 by a program '2'. When program '2' reaches its synchronization point 64, it reviews the flag table 60a and transfers all the data indicated as having been changed including that data changed during the execution of program '1'. Program 2 sends an unwind signal causing the data of program '1' and '2' to be accepted by the secondary processor. Program '3' is then executed and at its synchronization point 64 accomplishes a similar transfer and then returns control upon completion of that transfer to program 1.

After the unwind signal of program '3', the flag register 60a has no set flags as all the data that has changed was transmitted. Accordingly program 1 continues to execute and when it reaches its synchronization point 64 transmits only the data changed in program '1' after the return of control to program '1'. Because in this case, a low priority task was interrupted by a high priority task, program '2' essentially preempts the changes of program '1' as would be desired. That is, changes by higher priority programs preempt changes by lower priority programs.

Referring now to FIG. 9 in a more complex circumstance, program '1' of a low priority task 74 is preempted by program '2' of a high priority task 76 after the synchronization point 64 of program '1' has been reached but prior to completion of the packet collection portion 70 of program '1'. In this case, untransmitted data of program '1' is again transmitted by program '2' which can distinguish between transmitted and untransmitted packets by the resetting of the flags of the flag table 60a as packets are collected.

A program '3' is then executed and its changes are sent during packet collection portion 70 of program '3' and control is returned to low priority task 74. At this time, the remainder of packet collection portion 70 of program 1 including the unwind signal would normally be executed. However, the packet collection routine of the operating program recognizes this occurrence via link buffer semaphores and suppresses the remainder of packet collection portion 70 so that program '4' may execute immediately without further data transfer by packet collection portion 70 of program '1'.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A primary industrial controller exchanging input and output signals with a controlled process and communicating with a secondary industrial controller over a link, the primary industrial controller comprising:

(a) a memory holding:
      (i) a user program describing the control of the controlled process;
      (ii) an I/O data table holding values of the output signals exchanged with the controlled process;
      (iii) a flag table having flags indicating changes to the I/O data table caused by control of the controlled process after a first predetermined time;

(b) a processor communicating with the memory and operating to:
      (i) execute the user program to write values of the output signals to the I/O data table according to the user program;
      (ii) set flags in the flag table indicating changes in the I/O data table caused by execution of the user program; and
      (iii) at a second predetermined time after the first predetermined time, transmit to the secondary industrial controller only the values of output signal in the I/O data table that have changed as indicated by the set flags of the flag table;

wherein at an arbitrary switch-over time, the primary industrial controller ceases execution of the user program and the secondary industrial controller begins execution of the user program, the secondary industrial controller using transmitted values of the output signals.

2. The primary industrial controller of claim 1 wherein the second predetermined time occurs upon execution of a predetermined part of the user program.

3. The primary industrial controller of claim 2 wherein the predetermined part of the user program is an end of the user program.

4. The primary industrial controller of claim 1 wherein the I/O data table is divided into ranges of addresses and wherein each set flag indicates a change in at least one address in one range of addresses and wherein the transmission of the changed values in the I/O data table transmits values of all addresses within the ranges of addresses indicated by the set flags.

5. The primary industrial controller of claim 4 wherein the ranges of addresses are determined by a programmable configuration register.

6. The primary industrial controller of claim 1 wherein the changes in the I/O data table are detected by detecting a writing to the I/O data table.

7. The primary industrial controller of claim 1 wherein the processor further operates to:

(iv) at a second predetermined time after transmitting the changed values of the I/O data table, transmits to the secondary industrial controller an unwind signal indicating completion of the transmission of changed values of the I/O table.

8. The primary industrial controller of claim 7 wherein the processor resets the flags of the flag table as the changed values of the I/O table are transmitted to the secondary industrial controller.

9. The primary industrial controller of claim 1 wherein:

the processor is a multi-tasking processor executing multiple tasks each including at least one user program, with one user program of a task preempting another user program of another task according to priority rules and wherein;

at a second predetermined time, the processor also transmits to the secondary industrial controller an indication of the user program most recently being executed by the primary processor.

10. The primary industrial controller of claim 1 wherein:

the processor is a multi-tasking processor executing multiple tasks each including at least one user program, with one user program of a task preempting another user program of another task according to priority rules and wherein;

the processor's transmission to the secondary industrial controller of only the values of the I/O data table that have changed is according to an execution of program instructions in the same task as the user program;

whereby the transmission to the secondary industrial controller of changed I/O values may be preempted by another task.

11. The primary industrial controller of claim 10 wherein when the processor preempts the program instructions accomplishing the transmission during the transmission, with a higher priority task, the processor suppresses completion of the transmission when the user program is no longer preempted.

12. A method of providing a back-up for a primary industrial controller exchanging input and output signals with a controlled process and communicating with a secondary industrial controller over a link, the primary industrial controller including a processor communicating with a memory, the memory holding a user program for describing the control of the controlled process, an I/O data table holding values of the input and output signals exchanged with the controlled process, and a flag table holding flags indicating changes to the I/O data table, the method comprising the steps of:

(a) after a first predetermined time executing the user program to read and write to the O/O data table according to the user program;

(b) setting flags in the flag table indicating changes in the I/O data table of step (a) caused by control of the controlled process;

(c) at a second predetermined time after the first predetermined time, communicating to the secondary processor only the values of the I/O data table that have changed as indicated by the set flags of the flag table to the secondary processor; and (d) at an arbitrary switch-over time, causing the primary industrial controller to cease execution of the user program and the secondary industrial controller to begin execution of the user program, with the secondary industrial controller using transmitted values of the output signals.

13. The method of claim 12 wherein the second predetermined time occurs upon execution of a predetermined part of the user program.

14. The method of claim 13 wherein the predetermined part of the user program is an end of the user program.

15. The method of claim 12 wherein the I/O data table is divided into ranges of addresses and wherein each set flag indicates a change in at least one address in one range of addresses and wherein the transmission of the changed values in the I/O data table transmits values of all addresses within the ranges of addresses indicated by the set flags.

16. The method of claim 12 wherein the size of the ranges of addresses is determined by a programmable configuration register.

17. The method of claim 12 wherein the changes in the I/O data table are detected by detecting a writing to the I/O data table.

18. The method of claim 12 including the further steps of:

(iv) at a second predetermined time after transmitting the changed values of the I/O data table, transmitting to the secondary industrial controller an unwind signal indicating completion of the transmission of changed values of the I/O table.

19. The process of claim 18 wherein the processor resets the flags of the flag table as the changed values of the I/O table are transmitted to the secondary industrial controller.

20. The process of claim 12 wherein:

the processor is a multi-tasking processor executing multiple tasks each including at least one user program, with one user program of a task preempting another user program of another task according to priority rules and wherein the processor's transmission to the secondary industrial controller of only the values of the I/O data table that have changed is according to an execution of program instructions in the same task as the user program;

whereby the transmission to the secondary industrial controller of changed I/O values may be preempted by another task.

21. The process of claim 12 wherein when the processor preempts the program instructions accomplishing the transmission during the transmission, with a higher priority task, the processor suppresses completion of the transmission when the user program is no longer preempted.

* * * * *